Nov. 28, 1961  S. E. KAVINSKI  3,010,350
WIRE CUTTING AND GATHERING MECHANISM
Filed May 8, 1959

INVENTOR
Stephen E. Kavinski,
BY Michael Hertz
ATTORNEY

United States Patent Office 3,010,350
Patented Nov. 28, 1961

3,010,350
WIRE CUTTING AND GATHERING MECHANISM
Stephen E. Kavinski, York, Pa., assignor to Sylvania Electric Products Inc., a corporation of Delaware
Filed May 8, 1959, Ser. No. 812,014
6 Claims. (Cl. 83—109)

The invention relates to mechanism for gathering toward one end of a receptacle a number of wires as they are cut from a length of wire, with the cut wires all neatly arranged parallel to one another and in compact relationship.

It is an object of the invention to provide in combination with a wire cutting machine a mechanism to receive the cut wires and arrange them parallel to one another in close relationship within a receptacle.

Figure 1:
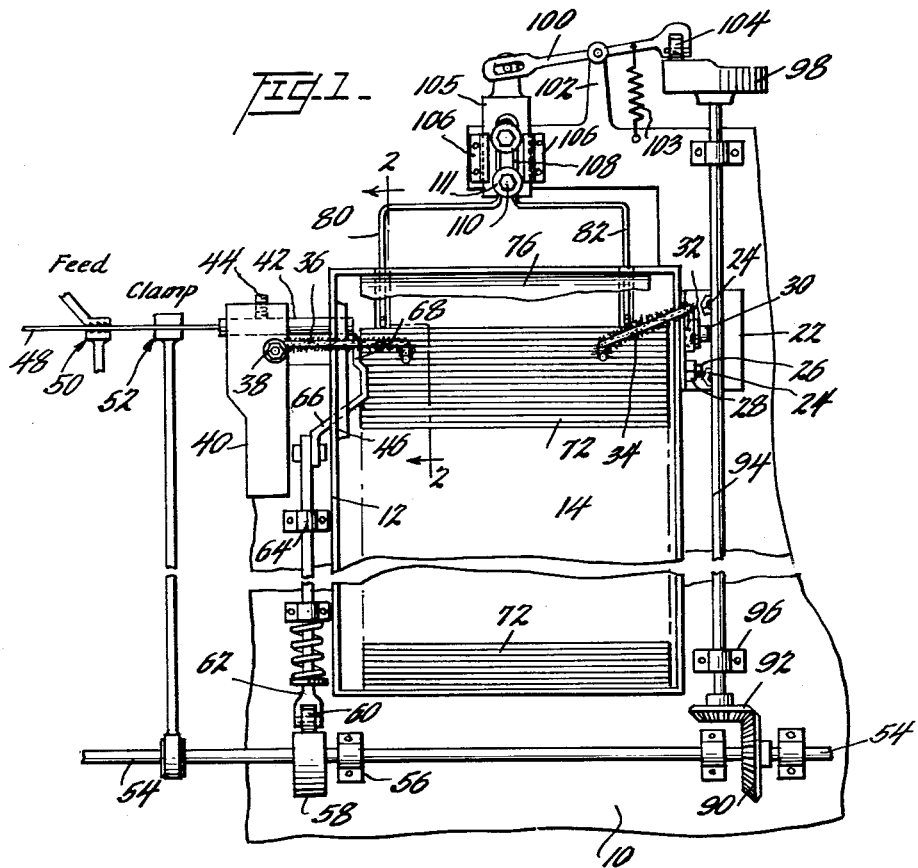
Figure 2:
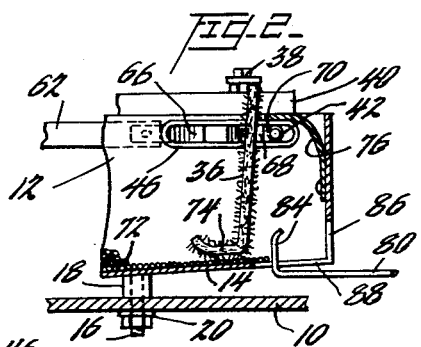
Figure 3:
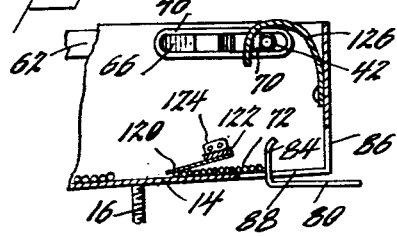

Other objects will become apparent upon consideration of the following specification when taken in conjunction with the accompanying drawing in which:

FIG. 1 is a fragmentary plan view of the mechanism.
FIG. 2 is a section on the line 2—2 of FIG. 1, and
FIG. 3 is a similar section showing a modified form of means for holding the cut wires to the bottom of the receptacle.

Now referring to the drawings with greater particularity, a support or table top 10 is provided on which is mounted a rectangular, in plan, receptacle 12, with its bottom 14 inclined and held to the table in any suitable fashion as by a number of threaded studs 16 each brazed to the undersurface of the receptacle with a top bevelled collar 18 serving as a spacer between table top and bottom of the receptacle and by a nut 20 threaded on the stud and engaging the undersurface of the table. In addition, at the rear right hand end of the receptacle, there is provided an angle bracket 22 bolted to the table as by bolts and nuts 24 and fastened to the receptacle by studs 26 brazed to the side of the receptacle and by nuts 28 and 30. The nut 30 and a suitable washer 32 additionally clamps to the receptacle the end of a hold down finger 34. A second hold down finger 36 has its end clamped by a bolt and nut 38 to a block 40 mounted on the table top. These fingers will be further described later on. Within the block 40 is clamped a tube 42 as by a set screw 44, the tube extending through a side wall of the receptacle to just within it, the opening in the side wall being reinforced by a flange 46, if desired. A wire 48 is fed through the tube to be cut off at the end of the tube within the receptacle by conventional alternately acting wire feed and clamp mechanism, as the feed 50 and clamp 52 controlled from the main drive shaft 54 rotatable in journals 56 on the table top. The same drive shaft has affixed thereto a cam 58 engageable with a follower roller 60 rotatably mounted in the fork of a rod 62 slidable in journals 64 on the table top and to whose other end is fastened a knife blade 66 passing through the opening in the side wall of the receptacle and terminating in a length of blade 68 parallel with the side wall and in a bevelled cutting edge 70 cooperating with the end of the tube 42 to effect a cutting of the wire into wire lengths as determined by the feed and clamp mechanism.

As the wires are cut, they fall to the inclined bottom of the receptacle. The cut wires, indicated at 72, are guided in their fall by the fingers 34 and 36 previously referred to, these being preferably of wire covered with a soft yielding covering, and may be of the same material as the fluffy covered pipe stem cleaners in conventional use. The fingers are inclined forwardly toward the forward end of the receptacle and at the bottom are each formed with a bent portion 74 substantially parallel to the bottom of the receptacle and spaced close to it. The covering on the fingers prevents scratching of the surface of the wire which may be a copper clad wire. The soft covering also extends over the portions 74 of the fingers and acts to press the cut wires very gently against the bottom of the receptacle to help keep the wires lined up parallel to one another and in one plane. To avoid the wire jumping upwardly and out of the receptacle, the back wall of the receptacle has affixed thereto a shield plate 76, curving over and above the length of wire being cut.

To push the cut wires forwardly in the receptacle there is provided a member to engage the last cut wire at its rear and to push it and the preceding cut wires forwardly. This member may be a bar to engage a considerable length of the wire but preferably the member comprises a pair of tines 80 and 82, each having a bent up end 84 to engage the cut wire. The tines, of course, engage the cut wire at spaced points along the length of the wire and the bent up ends 84 lie in a plane parallel to the front and rear ends of the receptacle. By reciprocation of the tines, the wires will be thrust forwardly and will pile up parallel to one another toward the front of the receptacle, from which end the pile of cut wires may be removed at will or periodically. The tines move in vertical slots 86 in the vertical rear end wall of the receptacle as well as in communicating longitudinal slots 88 in the bottom wall 14, the slots 88 being parallel to the side walls. The tines will therefore propel the last cut wire and those preceding it along the bottom of the receptacle forcing the cut wires past the fluffy covered fingers 34 and 36. At the forward end of the receptacle, after a sufficient number of wires have been cut, the wires will not only lie parallel to one another on the bottom of the receptacle, but they will pile up on one another.

To reciprocate the tines 80 and 82, the following mechanism is provided. Fixed on the main shaft 54 is a bevel gear 90 meshing with a bevel gear 92 fixed on a cross shaft 94 journaled in bearings 96 mounted on the table. The rear end of the shaft has affixed thereto a face cam 98 cooperating with a lever 100 pivoted on a rearwardly extending arm 102 of the table, a spring 103 normally maintains a cam follower 104 on the lever pressed against the face of the cam. The lever at its other end has a pivotal slidable connection with a slide bar 105 movable in guides 106 fastened to the rear of the table or on an extension thereof. The tines are portions of a bent wire with parallel sections 108 held to the slide bar by a pair of bolts 110 and washers 111, the bolts being threaded into the slide bar. The tines are preferably adjusted in such position on the slide bar that, on the rearward stroke of the tines, they will just lie within the vertical slots 86 in the rear wall of the receptacle.

In a modification of the invention, see FIG. 3, the fingers 34 and 36 are replaced by a very yielding spring plate 120 or rubber flap straddling the receptacle near the bottom thereof and inclined to the bottom to allow the wires to be thrust past the plate without much pressure. The member 120 is fastened to a ledger plate 122 with ears 124 at its ends securely fastened to the side walls of the receptacle. If desired the shield plate corresponding to the shield plate 76 in FIG. 2, and here indicated as 126, may be made arcuate at its free end to extend slightly downward forwardly of the wire issuing from the tube 42 to guide a cut wire downwardly. This same construction may be employed in FIG. 2 with appropriate slots cut in the forward end of the shield 76 to accommodate the fingers.

Having thus described the invention, what is claimed is:

1. A wire cutting and gathering mechanism comprising a receptacle, mechanism for feeding wire across the receptacle at a back end thereof in a direction parallel to an end wall of the receptacle, a cutter located adjacent the top of the receptacle and adjacent a side wall thereof to cut said wire and allow the cut wire to fall toward the bottom of the receptacle, fingers at each side of and close to the rear end of the receptacle, said fingers having resilient portions parallel to and spaced closely above the bottom of the receptacle to maintain the cut wires against the bottom of the receptacle, said fingers and resilient portions being covered with a soft yielding material, and a pusher at said back end reciprocatable in the receptacle to engage the cut wire after it has fallen to the bottom of the receptacle and to thrust it beyond the resilient portions toward the forward end of the receptacle.

2. A wire cutting and gathering mechanism comprising a receptacle having side and end walls and a bottom, mechanism for feeding wire across the receptacle at a back end thereof in a direction parallel to an end wall of the receptacle, a cutter located within the confines of the side and end walls of the receptacle adjacent the top and back end of the receptacle and adjacent a side wall thereof to cut said wire and allow the cut wire to fall toward the bottom of the receptacle, a shield within the receptacle at said back end of the receptacle overhanging the wire being cut to prevent undue scattering of the cut wire as it is severed from the wire, and a pusher at said back end and reciprocatable in the receptacle to engage the cut wire after it has fallen to the bottom of the receptacle and to thrust it toward the forward end of the receptacle.

3. The structure of claim 2 wherein there is provided a pair of downwardly and forwardly inclined fingers, each close to a side wall of the receptacle, at the back end of the receptacle and close to the wire being cut, to guide the falling cut wire toward the bottom of the receptacle.

4. The structure of claim 2 wherein mechanism is provided at the back end of the receptacle close to the wire being cut and having resilient portions close to the bottom of the receptacle to maintain the cut wires against the bottom of the receptacle.

5. The structure of claim 2 wherein there are provided fingers, one close to each side of the receptacle and close to the back end of the receptacle, said fingers having resilient portions parallel to and spaced closely above the bottom of the receptacle to maintain the cut wires against the bottom of the receptacle.

6. The structure of claim 2 wherein there is a spring bar at the back end of the receptacle spanning the side walls thereof and lying close to the bottom of the receptacle and immediately in advance of the falling wire to maintain the cut wires against the bottom of the receptacle.

References Cited in the file of this patent

UNITED STATES PATENTS

| | | |
|---|---|---|
| 567,392 | Hough | Sept. 8, 1896 |
| 1,344,034 | Hart | June 22, 1920 |
| 1,580,054 | Laencher | Apr. 6, 1926 |
| 2,257,446 | Amidon | Sept. 30, 1941 |
| 2,728,090 | Haswell | Dec. 27, 1955 |
| 2,800,180 | Jensen | July 23, 1957 |

FOREIGN PATENTS

| | | |
|---|---|---|
| 18,170 | Great Britain | July 30, 1910 |
| 393,343 | Great Britain | June 8, 1933 |